(12) United States Patent
Moshiri et al.

(10) Patent No.: US 8,230,698 B2
(45) Date of Patent: Jul. 31, 2012

(54) METHOD FOR CONDITION MONITORING OF THE HTBS FURNACE USING SENSOR FUSION

(76) Inventors: Behzad Moshiri, Tehran (IR); Behrooz Sadeghi, Tehran (IR)

(*) Notice: Subject to any disclaimer, the term of this patent is extended or adjusted under 35 U.S.C. 154(b) by 644 days.

(21) Appl. No.: 11/934,743

(22) Filed: Nov. 3, 2007

(65) Prior Publication Data
US 2008/0236198 A1 Oct. 2, 2008

(51) Int. Cl.
- *C03B 9/41* (2006.01)
- *C03B 35/14* (2006.01)
- *C03B 17/06* (2006.01)
- *C03B 25/00* (2006.01)
- *C03B 27/00* (2006.01)

(52) U.S. Cl. ...... 65/29.19; 65/29.1; 65/29.11; 65/29.12; 65/94; 65/95

(58) Field of Classification Search .......... 65/162, 65/29.1–29.12, 90, 94, 95
See application file for complete search history.

(56) References Cited

U.S. PATENT DOCUMENTS
4,144,045 A * 3/1979 Starr .............................. 65/107
4,361,428 A * 11/1982 Bartusel et al. .............. 65/29.18

OTHER PUBLICATIONS

"Encyclopedia of chemistry, theoretical, practical and analytical as applied to the arts and manufactures" vol. II. J.B. lippincott & co. 1879 as viewed at http://books.google.com/books?id=KMboAAAAMAAJ&pg=PA37&dg=tempering+sheet+glass+temperature&hl=en&ei=XDvLTbbhlerA0AHRspDhCA&sa=X&oi=book_result&ct=result&resnum=1&ved=0CFkQ6AEwAA#v=onepage&q.*

* cited by examiner

*Primary Examiner* — Matthew Daniels
*Assistant Examiner* — Jodi C Franklin
(74) *Attorney, Agent, or Firm* — Barry Choobin; Choobin & Choobin Consultancy

(57) ABSTRACT

The present invention discloses a method for temperature monitoring of Horizontal Tempering and bending system (HTBS) furnace in glass industries. The present invention improves furnace heaters shut down performance, thereby causing longer lifetime for furnace equipments. The present invention further increases transparency for output tempered and bent glass. The present invention discloses multiple sensors for temperature control of the furnace, wherein said sensors provide a precise and accurate measurement of the glass temperature separately. After acquiring sensors data, the fusion process is done using Bayesian approach in order to achieve more accurate values for glass temperature, thereby enhancing the system performance and decreasing the number of unnecessary emergency shut downs (unnecessary ESDs) of the furnace heating elements, which are produced due to false alarms.

4 Claims, 10 Drawing Sheets

Table 1
The most common data fusion and integration methods

| Fusion method | Applications |
|---|---|
| Pixel level fusion | Image processing, image segmentation |
| Bayesian theory | Decision making between multiple hypotheses |
| Dempster-Shafer theory of evidence | Decision making, Beliefs intervals |
| Neural Network | Signal interpretation |
| Neyman-Pearson criteria | Decision making |
| Fuzzy Logic | Handle vagueness |
| Knowledge based system | Pattern recognition |
| Markov random field | Image processing |

FIG. 10

METHOD FOR CONDITION MONITORING OF THE HTBS FURNACE USING SENSOR FUSION

SPONSORSHIP STATEMENT

The present invention is sponsored by School of Elec. & Comp. Engineering, University of Tehran, Tehran, Iran.

FILED OF THE INVENTION

The present invention relates generally to molten glass temperature monitoring and control in an automotive horizontal tempering and bending furnace where furnace heating zone elements are switched on and off according to the value of molten glass temperature.

BACKGROUND OF THE INVENTION

A maintenance engineer should always monitor the plant condition. A variety of practical observations and analyses of machine performance data, such as number of ESDs, frequency of ESDs, output product quality, number of defective products produced, and plant performance efficiency should be considered.

These items bring the idea that a particular parameter of process requires careful monitoring in order to ensure a reasonable level of operational availability.

Reliability of data that has been given from a sensor is of great importance in condition monitoring. One of the ways to reach this level of fidelity is sensor data fusion.

The present invention discloses multiple sensors for temperature control of the furnace, wherein said sensors provide a precise and accurate measurement of the glass temperature separately. After acquiring sensors data, the fusion process is done using Bayesian approach in order to achieve more accurate values for glass temperature, thereby enhancing the system performance and decreasing the number of unnecessary emergency shut downs (unnecessary ESDs) of the furnace heating elements, which are produced due to false alarms.

RELATED PRIOR ARTS

The U.S. Pat. No. 5,051,121 issued to Grundy in September 1991, is related to a method of controlling the temperature of a multiple segment fiber glass bushing. Bushing current is the parameter by which the temperature is controlled and maintained at a predetermined value.

The U.S. Pat. No. 4,925,473 issued to Jeskey et al in May 1990, is related to controlling the speed, uniformity and accuracy of the heating (by convection method) of working zone of the performance in a glass drawing operation.

The U.S. Pat. No. 4,775,400 issued to Wright et al in October 1988, is related to a method for fiber glass bushing control and weighing means for weighing complete collections of glass fiber strands.

The U.S. Pat. No. 4,317,666 issued to Faure et al in March, 1982, is related to a system for controlling and maintaining optical fiber tensile stress is presented wherein regulating furnace temperature causes optical fiber main characteristic (tensile stress) to maintain constant.

The U.S. Pat. No. 4,457,772 issued to Haynes et al in July 1984, is related to a management control system for a glass factory having a plurality of individual section glassware forming machines.

The U.S. Pat. No. 4,162,907 issued to Anderson in July 1979 is related to a method for Glass sheet manufacturing is presented.

R. Keith Mobley, "An Introduction to Predictive Maintenance, Elsevier Science (USA), Second Edition, 2002; W A. Starr, P. Hannah, J. Steban & R. Willetts. "Data fusion as a model for advanced condition-based maintenance" Paper presented at Condition Monitoring 2001, June 2001, Oxford, UK; Sangwook Park & C. S. Ceorge Lee, "Fusion-based Sensor Fault Detection", Proceedings of the 1993 international symposium on Intelligent control, Chicago, Ill., USA—August 1993; J. esteban & A. G. Starr, P. Bryanston Cross, "Data Fusion: Models & Procedures", Integrating Dynamics, Condition Monitoring, and Control for the 21th century. 1999 Balkema, Rotterdam; Manuals of the Tamglass HTBS; Roy et al, "Quantitave Comparison of sensor fusion architectural approaches in an algorithm level test bed", Proc. SPIE, 1996, Vol 2759, pp 372-384; Sun H., et al, "Study of an algorithm of multisensor data fusion" IEEE Proceeding of the National Aerospace and Electronic Conference, 1994, Vol 1, pp. 239-245; Edwards I, et al, "Fusion of NDT data", British Journal of Non-Destructive Testing, 1993, Vol 35, No. 12, pp. 710-713.

SUMMARY OF THE INVENTION

In accordance with present invention is a first objective of the present invention to provide an automotive glass temperature monitoring and control method in a horizontal tempering and bending furnace, wherein said method comprises steps of: loading glass on a first conveyor; conveying said glass to a furnace wherein said furnace comprises a heating zone; bending said glass; quenching said glass; cooling said glass; loading said glass on a second conveyor; unloading said glass from said second conveyor; reading molten glass temperature in said furnace wherein said reading temperature consists of reading of temperature by a first and a second thermocouples and a first and a second pyrometers simultaneously, and wherein said first thermocouple and said first pyrometer are designated for right side of the glass, and wherein said second thermocouple and said second pyrometer are designated for left side of said glass; measuring glass temperature on said right side of said glass and on said left side of said glass; fusing temperature measurements of said first thermocouple and said first pyrometer of said right side of the glass, thereby obtaining a first fused measurement; fusing temperature measurements of said second thermocouple and said second pyrometer of said left side of said glass, thereby obtaining a second fused temperature, where said fusion is according to:

$$p = P(B \mid A)$$

$$P(B \mid A_i) = \frac{P(A_i \mid B) \cdot P(B)}{P(A_i)},$$

Where $A_i$ is a possible scenario with an effect on event B, and $P(B \mid A_i)$ is a measure of how likely $A_i$ is the cause of event B, $$L(B) = \log P(A \mid B) = \sum_{i=1}^{n} P(A_i \mid B)$$

Where L(B) is logarithm of likelihood of event A given event B, $$P(A_i \mid B) = \frac{1}{(2\pi)^{n/2} |C_i|^{1/2}} * \exp\left(-\frac{1}{2}(A_i - B)^t C_i^{-1}(A_i - B)\right),$$

$$L(B) = \log P(A \mid B)$$
$$= \sum_{i=1}^{n} \left(-\frac{1}{2}\log[(2\pi)^n |C_i|] - \frac{1}{2}(A_i - B)^t C_i^{-1}(A_i - B)\right)$$

Where $C_i$ is covariance matrix of event $A_i$, $$\tilde{B} = \frac{\sum_{i=1}^{n} C_i^{-1} A_i}{\sum_{i=1}^{n} C_i^{-1}}$$

where $\tilde{B}$ is the best estimate for event B and $A_i$ is temperature measurement of ith sensor, $$\tilde{B} = \frac{\sigma_1^2 A_2 + \sigma_2^2 A_1}{\sigma_1^2 + \sigma_2^2}$$

Where $\tilde{B}$ is molten glass fused true temperature and $A_1$ and $A_2$ are thermocouple and pyrometer measurements of molten glass temperature respectively and $\sigma_1^2$ and $\sigma_2^2$ are variances of thermocouple and pyrometer crude measurement data respectively;

Comparing said first fused temperature measurement and said second fused temperature measurement with furnace heating elements shut down temperature threshold value;

sending off command to heating elements of said heating zone where at least one fused temperature value is over the temperature threshold value; sending on command to heating elements of said heating zone where said first and said second fused temperature measurements values are below the temperature threshold value, thereby decreasing number of unnecessary emergency shut downs of heating elements of the furnace.

Is another objective of the present invention, to provide a control system for enhancing transparency of outgoing tempered and bent glass of the furnace.

Is another objective of the present invention, to provide a control system for increasing number of necessary emergency shut downs of heating elements of the furnace.

Is another objective of the present invention, to provide a control system for enhancing the transparency of the outgoing tempered and bent glass of the furnace system by way of more accurate molten glass temperature measurement.

Is another objective of the present invention, a system for automotive glass temperature monitoring and control in a horizontal tempering and bending furnace, wherein said system comprises: means for loading glass on a first conveyor; means for conveying said glass to a furnace wherein said furnace comprises a heating zone; means for bending said glass; means for quenching said glass; means for cooling said glass; means for loading said glass on a second conveyor; means for unloading said glass from said second conveyor; means for reading molten glass temperature in said furnace wherein said reading temperature consists of reading of temperature by a first and a second thermocouples and a first and a second pyrometers simultaneously, and wherein said first thermocouple and said first pyrometer are designated to right side of the glass, and wherein said second thermocouple and said second pyrometer are designated to left side of said glass; means for measuring glass temperature on said right side of said glass and on said left side of said glass; means for fusing temperature measurements of said first thermocouple and said first pyrometer of said right side of the glass, thereby obtaining a first fused measurement; means for fusing temperature measurements of said second thermocouple and said second pyrometer of said left side of said glass, thereby obtaining a second fused temperature; means for comparing said first fused temperature measurement and said second fused temperature measurement with furnace heating elements shut down temperature threshold value;

Means for sending off command to heating elements of said heating zone where at least one fused temperature value is over the temperature threshold value; and means for sending on command to heating elements of said heating zone where said first and said second fused temperature measurements values are below the temperature threshold value.

BRIEF DESCRIPTION OF THE DRAWINGS

FIG. 10 shows a Table. 1 comprising a list of the most common data fusion and integration methods.

DETAILED DESCRIPTION OF THE INVENTION

Figure 1:
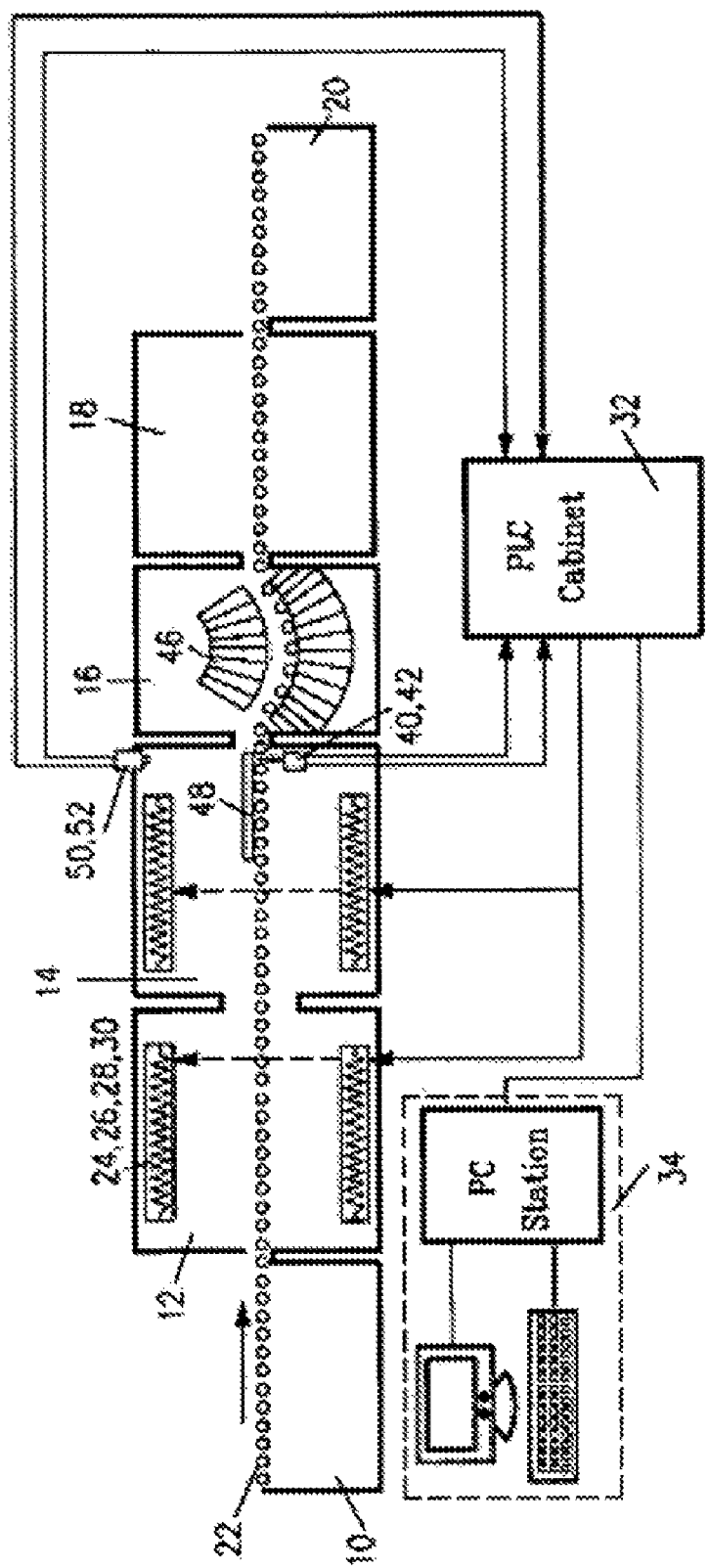
FIG. 1 is a block diagram of the system comprising furnace and monitoring and control system.
Figure 2:
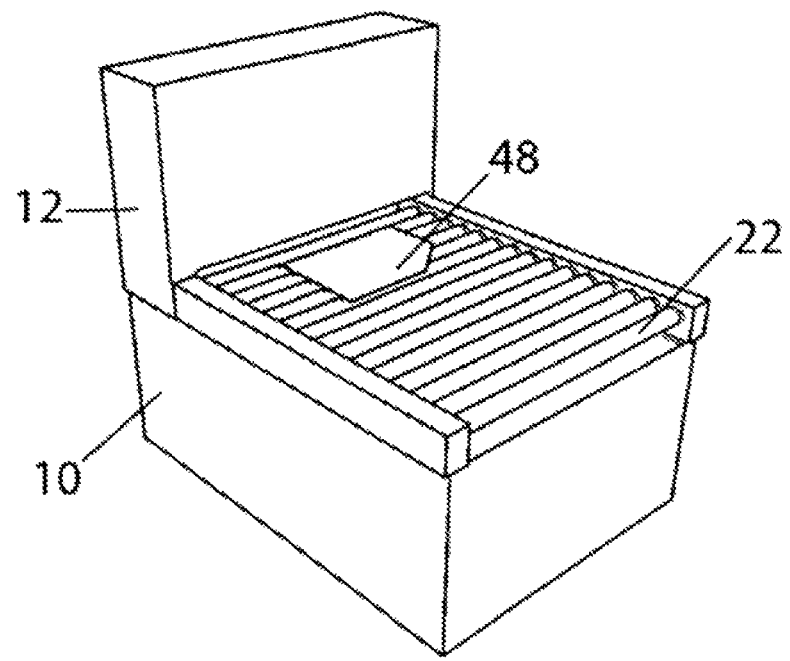
FIG. 2 is a view of loading conveyor at the inlet of the furnace where the glass is transported to the furnace heating zones by the rollers.

The invention will be described now in relation to a specific embodiment, wherein the same parts will be referred to the same numbers and wherein FIG. 1 and FIG. 2 show a block diagram of the system.

The HTBS is designed to produce cylindrically bent and flat tempered glass that meets automotive and building glass standards. The process is used in automotive glass production industries for strengthening and bending flat glasses cylindrically with a desired radius. As shown in FIG. 1, the HTBS main parts that are in addition to temperature monitoring and control system are as follows:

Loading Conveyor 10

The loading conveyor 10 is used to load the glass plates ready for tempering. The conveyor 10 is operated by the control system. To ease the loading of the glass plates, there are the Loading Acknowledge push button and loading ready indicator light. The loading acknowledge push button is used to inform the control system that the glass load on the conveyor 10 is ready for tempering. The loading conveyor 10 can be seen in FIG. 2 with its ceramic rollers 22.

Furnace

Figure 3:
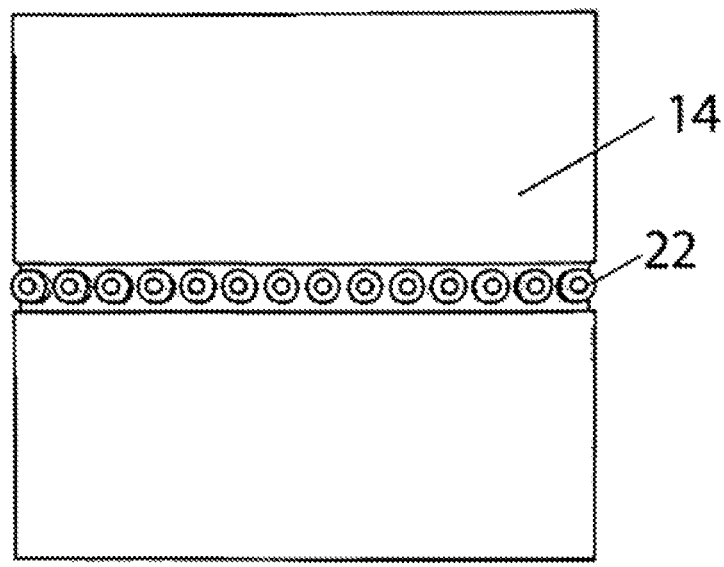
FIG. 3 is lateral view of the second heating zone of the furnace where glass temperature reaches from ambient temperature to 700 centigrade degree. The glass moves from the beginning of the heating zone to its end and returns and repeats this movement several times to reach the desired temperature.

The furnace is divided into heating zones 12, 14. Each heating zone 12, 14 consist of resistor elements or heaters 24, 26, 28, 30 placed lengthwise. The heaters 24, 26 and 28, 30 are paired to top and bottom heaters. FIG. 3 shows a lateral view of the second heating zone 14 of the furnace.

When the furnace temperature is within preset temperature, blower is on and the system is otherwise normal, the acknowledged glass load is driven from the loading conveyor 10 to the furnace and the next load can be placed on the conveyor 10. The load starts to automatically oscillate inside the furnace. The oscillation length depends on operation mode. The control system controls the movement of the load and when the heating time is over, the load moves from the furnace through the middle conveyor to the bending section 16.

Bending Section 16 & Chiller 46

The glass 48 which is now completely melted is going to bent easily with desired ratio in this section. The glass which is continuously heated in the previous heating zones 12, 14, is also going to be quenched in only several seconds at the same time with bending process. This suddenly cooling the bent glass will make the glass completely securitized and safe.

Figure 4:
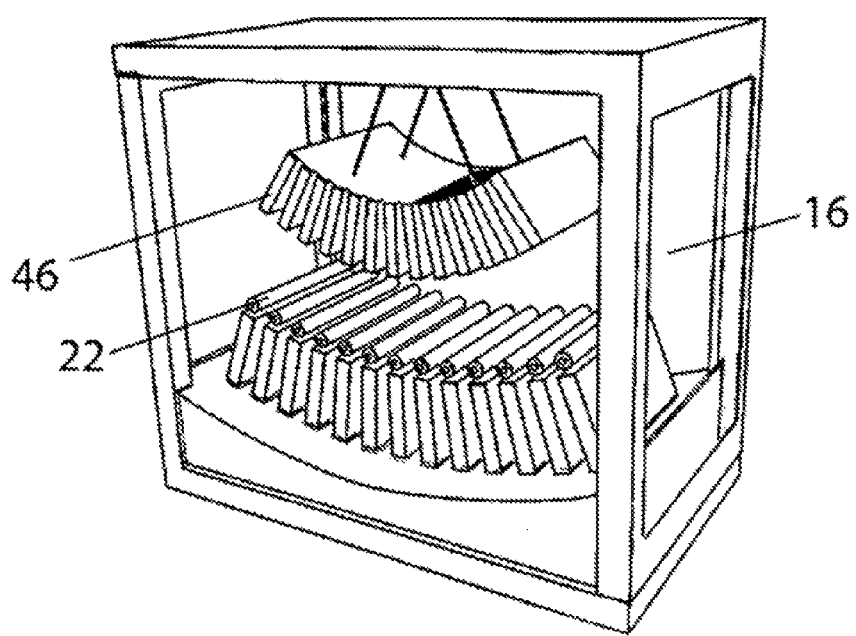
FIG. 4 is a lateral view of the bending section where bending and quenching process occur simultaneously.

The heated glass is automatically conveyed to the bender where it is bent and tempered at a predetermined rate. For the transfer time the conveyors are synchronized to enable smooth transfer. The quenching power is adjusted to the appropriate level with the linear motor at the intake of the blower. FIG. 4 shows a left side view of the bending section 16 and chiller 46.

Nozzle level of the after cooling section 18 has to be adjusted to the right height depending on the bending radius or glass thickness.

Cooling Section 18 & Unloading Conveyor 20

The molten glass 48 temperature which is about 700 centigrade degree is reduced to about 100 centigrade degree in the bending section 16. But the furnace operator can not unload the glass yet, since it is still so hot. So the cooling conveyor is designed to decrease the glass temperature to ambient temperature, so that the operator can unload the glass manually.

Figure 5:
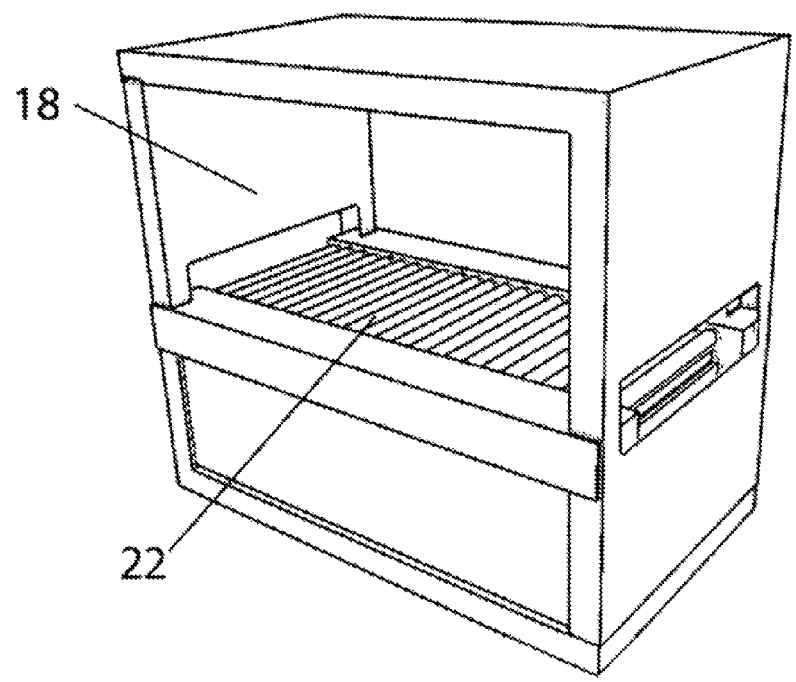
FIG. 5 is an illustration of Cooling Conveyor where bent glass temperature reduces from about 100 centigrade degree to near the ambient temperature.
Figure 6:
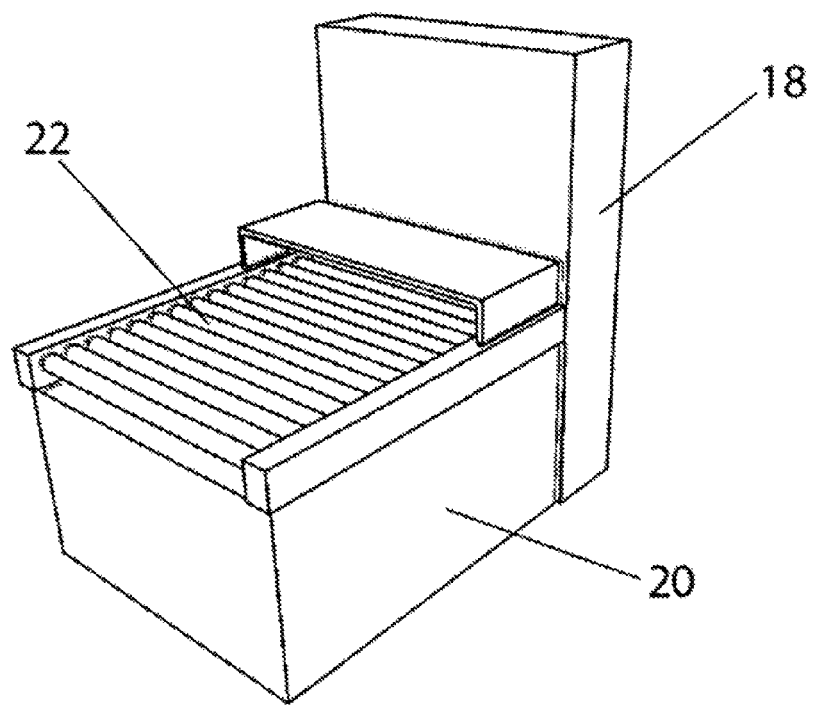
FIG. 6 is an illustration of HTBS Unloading Conveyor where operator takes the bent glass from the conveyor.

After the glass is processed, it is automatically driven to the unloading conveyor 20. The glass load is automatically driven to the far end of the conveyor for easy-up. The last roller of the conveyor is free rolling to aid in handling the glass sheets. FIG. 5 and FIG. 6 show the cooling section 16 and unloading conveyor 20 respectively.

Fusion-Based Condition Monitoring

In order to (a) have a better understanding of the process flow, (b) for sending appropriate commands to the network nodes, and (c) to avoid unnecessary ESDs, it is required to collect all of the important information and parameters of the system in PLC cabinet 32 and PC station 34.

The present invention concentrates on one of the most important parameters of the HTBS which is the glass temperature.

The corresponding monitoring technique must be selected according to the specific process characteristics. The present invention uses thermography as the condition monitoring techniques to find an appropriate method for the temperature control. Other techniques like vibration monitoring, Tribology, visual inspection, process parameters, and ultrasonic can not be easily used for the temperature monitoring and control of the glass.

Generally in HTBS furnace, instrument for measuring the glass temperature is thermocouple 40 and 42. To have a high reliable output reading it is necessary that thermocouple 40 or 42 touches the media continuously. Here the molten glass 48 can not be touched by thermocouple 40 or 42. So it is situated somewhere near the molten glass 48 and measures the temperature of the points nearby the glass. The molten glass 48 causes the thermocouples 40, 42 output reading to be less reliable and more uncertain. Said thermocouples have delay in response to glass temperature changes, because it takes time for the air temperature near the glass to follow the glass temperature. Said thermocouples also ignore the rapid oscillations of the glass temperature.

Figure 7:
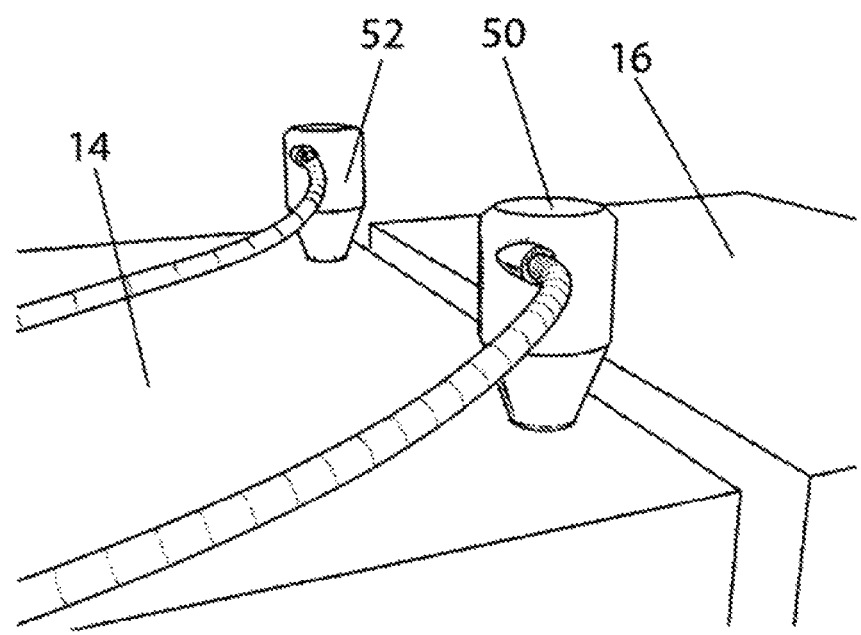
FIG. 7 is a representation of the system where Pyrometers installed additionally on the System.

These constraints cause to use of a no tactile sensor. The present invention discloses appropriate sensors that meet the required condition wherein said sensors are pyrometer 50, 52. Said sensors read the temperature of a body by measuring the amount of its infra red radiation. Using these sensors need special care. Variations in surface condition can change the actual emission factor for molten glass 48. The atmosphere between the glass and the pyrometers 50, 52 must also be considered. Water vapor and other gases absorb infrared radiation, airborne dust, some lighting, and other variables in the surrounding atmosphere can distort measured infrared radiation. So a maintenance engineer should not rely only on pyrometers 50, 52 output reading. FIG. 7 shows the two pyrometers 50, 52 which are installed at the end of the last heating zone 14. In this position the pyrometers 50, 52 can measure the amount of infrared ray transmitted from the heated glass which is transported bellow, in the furnace.

Considering these not highly precise measurement, there are two alternatives to achieve a precise measurement. First alternative is to use a highly precise instrument that is extremely expensive (e.g. an infrared imaging system with power of scanning a large area), and second alternative is to fuse the measurement of the common sensors namely thermocouples 40, 42 and pyrometers 50, 52. The present invention employs the second alternative in order to achieve less costly high precision measurement. A typical pyrometer 50 or 52 and a thermocouple 40 or 42 together cost about $3,000, while an infrared imaging system costs about $50,000.

Appropriate Fusion Method & Problem Formulation

FIG. 10 shows a Table (1) comprising conventional data fusion methods and their practical applications.

Among common sensor fusion method, appropriate method should be selected according to process characteristics and type of data which has been acquired. In light of amount of data in different periods of time, and of the Gaussian nature of these data, the present invention approaches the Bayesian theory.

The formulation of the Bayesian approach applies to the gathered data in accordance to the following:

Given the event A, the conditional probability of event B is:

$$p = P(B|A). \tag{1}$$

According to Bayesian rule:

$$P(B \mid A) = \frac{P(A \mid B) \cdot P(B)}{P(A)}, \quad (2)$$

assume $A_1, A_2, \ldots, A_n$ are possible scenarios with an effect on event B. $P(B \mid A_i)$ is a measure of how likely it is that $A_i$ is the cause. So it is called as the likelihood of $A_i$ given B.

Based on maximum likelihood, the best estimate of object property $\tilde{B}$ is computed, that is computing $\tilde{B}$ which maximizes $P(A \mid B)$.

Here $P(A \mid B)$ is probability of sensor output being A, given that the object property is B. And $P(B \mid A)$ is probability of object property being B, given that the sensor output is A.

In Maximizing $$P(A \mid B) = \prod_{i=1}^{n} P(A_i \mid B)$$

for easy computation, logarithm of likelihood is used:

$$L(B) = \log P(A \mid B) = \sum_{i=1}^{n} P(A_i \mid B). \quad (3)$$

Based on experimental results, the output of pyrometers 50, 52 and thermocouples 40, 42 follow Gaussian density function. Therefore:

$$P(A_i \mid B) = \frac{1}{(2\pi)^{n/2} |C_i|^{1/2}} * \exp\left(-\frac{1}{2}(A_i - B)^t C_i^{-1}(A_i - B)\right). \quad (4)$$

And then:

$$L(B) = \log P(A \mid B) = \sum_{i=1}^{n} \left(-\frac{1}{2} \log[(2\pi)^n |C_i|] - \frac{1}{2}(A_i - B)^t C_i^{-1}(A_i - B)\right). \quad (5)$$

Maximizing the above formula, the best estimate for B is as follows:

$$\tilde{B} = \frac{\sum_{i=1}^{n} C_i^{-1} A_i}{\sum_{i=1}^{n} C_i^{-1}}. \quad (6)$$

And in case of two sensors, it is:

$$\tilde{B} = \frac{\sigma_1^2 A_2 + \sigma_2^2 A_1}{\sigma_1^2 + \sigma_2^2}. \quad (7)$$

All of the above calculations will be done in PLC station 32.

Experimental Results

Outputs reading of pyrometers 50, 52 and thermocouples 40, 42 simultaneously are acquired in 30 different times. The original data of the thermocouple 40 or 42 is a voltage in the range of milivolts and the output format of the pyrometers 50, 52 is a standard 4-20 mA signal. Both of these output signals are proportional to the glass temperature. A Gaussian density function with specific mean value and variance is found for each of the sensors.

Figure 8:
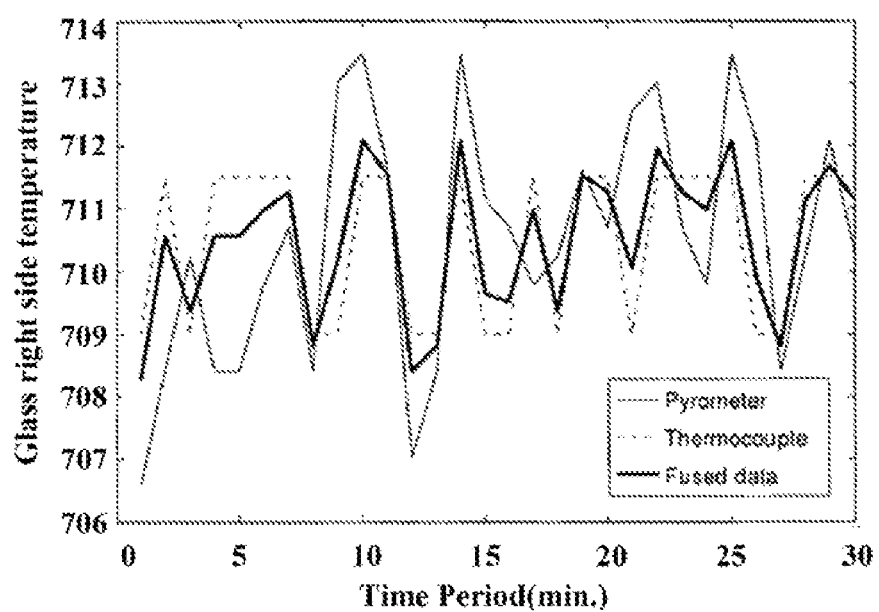
FIG. 8 is a representation of results where output of the thermocouple in dashed line, output of pyrometer in thin solid line, and fused data in thick solid line in 30 time periods for the right side of the glass. All temperatures are in Celsius.

Therefore, the fused data is computed according to (7). FIG. 8 shows the outputs of the sensors and the fused data for the 30 time periods for the right side of the glass. (All of the fusion procedure for right and left side of the glass is done separately with two separate couple of sensors.)

FIG. 8 shows the measurement of thermocouple 40 which has few changes. It is because it measures the temperature of the points nearby the glass. So it can not sense the real glass temperature. If the glass temperature suddenly increases and decreases in a small period of time, it is probable that this temperature profile is not transmitted exactly to the points nearby the glass.

Referring back to FIG. 8, the pyrometer 50 output has a lot of variations. It is because pyrometer 50 output reading is very noise sensitive and can be distorted with special environment conditions such as airborne dust, water vapor, and lightings of other sources.

The limit for the furnace heating elements to be shut down is 712 centigrade degree. Based on pyrometer 50 measurement as shown in FIG. 8, the furnace will be shut down 4 times. But making decision according to the present invention fused data; no emergency shut down will be occurred for the furnace. It is obvious that most of these shut downs are unnecessary and because of noisy outputs of the pyrometer 50. So by applying sensor fusion the number of unnecessary ESDs (which produced due to false alarms) has been reduced.

Figure 9:
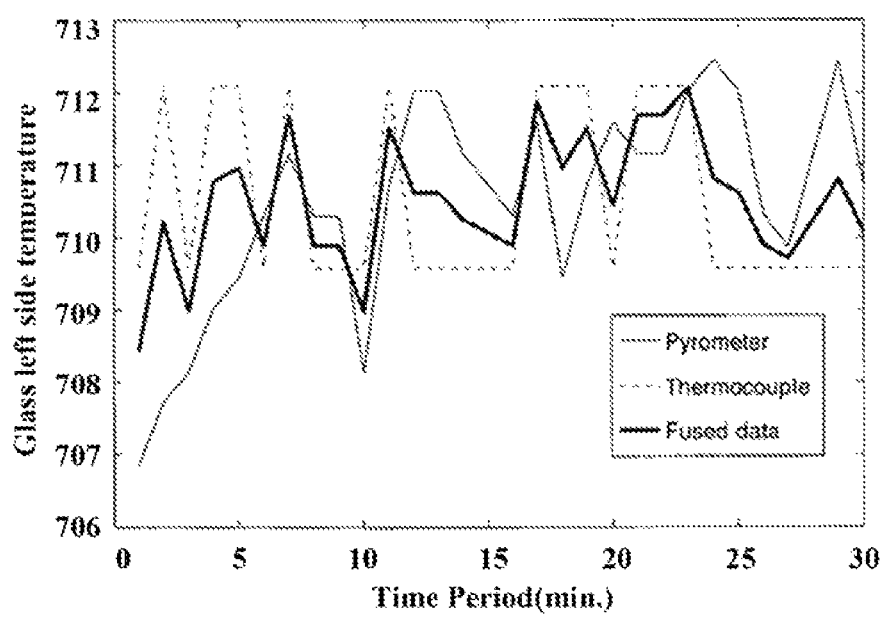
FIG. 9 is a representation of results where output of the thermocouple in dashed line, output of pyrometer in thin solid line, and fused data in thick solid line in 30 time periods for the left side of the glass. All temperatures are in Celsius.

FIG. 9 shows similar results for the left side of the glass. As it is illustrated, in this side the number of ESDs based on pyrometer 52 measurements is two, and the fused data reaches the threshold 712 degree centigrade once. So an unnecessary ESD is avoided while a necessary ESD is executed and the heaters shut down. (In $23^{rd}$ period where both sensors report the temperature 712 centigrade degree)

Besides, according to Bayesian rule for 2 sensors we can write:

$$P(B \mid A_1, A_2) = \frac{P(B) \cdot P(A_1 \mid B) \cdot P(A_2 \mid B)}{P(B) \cdot P(A_1 \mid B) \cdot P(A_2 \mid B) + P(\overline{B}) \cdot P(A_1 \mid \overline{B}) \cdot P(A_2 \mid \overline{B})} \quad (8)$$

If we assume the event B to be the desired reliability for fused output reading, and events $A_1$, $A_2$ to be reliable output reading for pyrometers 50, 52 and thermocouples 40, 42 respectively, it can be easily seen that output reading reliability is enhanced while using fused data instead of each sensor data separately( $$\frac{26}{30}$$

and $$\frac{15}{30}$$

for pyrometers 50, 52 and thermocouples 40, 42 respectively):

$$P(B|A_1, A_2) = \frac{\frac{59}{60} \cdot \frac{26}{30} \cdot \frac{15}{30}}{\frac{59}{60} \cdot \frac{26}{30} \cdot \frac{15}{30} + \frac{1}{60} \cdot \frac{4}{30} \cdot \frac{15}{30}} = 0.997.$$

The allocated probabilities are calculated on the basis of statistical acquired data for 30 time periods for each of the pyrometers 50, 52 and thermocouples 40, 42.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A method for automotive glass temperature monitoring and control in a horizontal tempering and bending furnace wherein said method comprises steps of:

loading glass on a first conveyer;

conveying said glass to a furnace to obtain a molten glass wherein said furnace comprises a heating zone;

reading said molten glass temperature in said furnace wherein said reading of molten glass temperature consists of reading the temperature of a first thermocouple, a second thermocouple, a first pyrometer and a second pyrometer simultaneously, and wherein said first thermocouple and said first pyrometer are designated for reading the temperature of a right side of the molten glass, and wherein said second thermocouple and said second pyrometer are designated for reading the temperature of a left side of said molten glass;

measuring said molten glass temperature on said right side of said molten glass and on said left side of said molten glass and wherein said measuring said molten glass temperature on said right side of said molten glass and on said left side of said molten glass is done by a control system;

fusing said temperature measurements of said first thermocouple and said first pyrometer of said right side of said molten glass by Bayesian fusion, thereby obtaining a first fused temperature measurement for said right side of said molten glass;

fusing temperature measurements of said second thermocouple and said second pyrometer of said left side of said molten glass by Bayesian fusion, thereby obtaining a second fused temperature measurement for said left side of said molten glass, where said Bayesian fusion is according to:

$$P(B|A_i) = \frac{P(A_i|B) \cdot P(B)}{P(A_i)}$$

where $A_i$ is a possible scenario with an effect on B, and $P(B|A_i)$ is a measure of how likely $A_i$ is the cause of B, and said molten glass temperature measurement consist of $A_i$ which comprises of $A_1$ and $A_2$, and wherein $A_i$ is an output of pyrometers and thermocouples and B is a fused output temperature of glass and wherein said fused output temperature of glass is a molten glass temperature, and where said $A_1$ and $A_2$ are thermocouple and pyrometer measurements of said molten glass temperature respectively and B is a molten glass temperature estimation which is based on maximum likelihood with a best estimate, $\tilde{B}$, that maximizes P(A|B), where $A_1$ and $A_2$ represent A which is an overall measurement of molten glass temperature, and $$LL(B) = \log P(A|B) = \sum_{i=1}^{n} P(A_i|B)$$

where LL(B) is the logarithm of likelihood function L(B|A)=P(A|B) and $$P(A_i|B) = \frac{1}{(2\pi)^{n/2}|C_i|^{1/2}} * \exp\left(-\frac{1}{2}(A_i - B)^t C_i^{-1}(A_i - B)\right)$$

hence $$LL(B) = \log P(A|B) = \sum_{i=1}^{n} \left(-\frac{1}{2}\log[(2\pi)^n |C_i|] - \frac{1}{2}(A_i - B)^t C_i^{-1}(A_i - B)\right)$$

where $C_i$ is a covariance matrix of $A_i$, and wherein $C_i$ is a variation in measurements of value $A_i$, and wherein $C_i$ is a Gaussian density function and resulting $$\tilde{B} = \frac{\sum_{i=1}^{n} C_i^{-1} A_i}{\sum_{i=1}^{n} C_i^{-1}}$$

wherein $\tilde{B}$ maximizes P(A|B) and if n is equal to 2 the result is $$\tilde{B} = \frac{\sigma_1^2 A_2 + \sigma_2^2 A_1}{\sigma_1^2 + \sigma_2^2}$$

where $\tilde{B}$ is a molten glass fused temperature and $A_1$ and $A_2$ are thermocouple and pyrometer measurements of molten glass temperature respectively and where $\sigma_1^2$ and $\sigma_2^2$ are variances of thermocouple and pyrometer measurement of said molten glass temperature respectively, and a fusion temperature for the right side and the left side of the glass is done separately with two separate couple of sensors and wherein sensors includes thermocouples and pyrometers;

comparing said first fused temperature measurement and said second fused temperature measurement with a furnace heating elements shut down temperature threshold value, and wherein said comparing said first fused temperature measurement and said second fused temperature measurement with a furnace heating elements shut down temperature threshold value is done using a temperature measurement and control system;

sending an off command to the heating elements of said heating zone where at least one fused temperature value is over the temperature threshold value and wherein the temperature threshold value is 712 degree centigrade;

sending an on command to the heating elements of said heating zone where said first and said second fused temperature measurements values are below the temperature threshold value, thereby decreasing a number of shut downs of the heating elements of the furnace due to false alarms and noisy outputs from pyrometers;

bending said molten glass;

quenching said molten glass to obtain a bended glass;

cooling said bended glass;

loading said bended glass on a second conveyor; and unloading said bended glass from said second conveyor.

2. The method as claimed in claim 1, further comprising a step of enhancing transparency of outgoing tempered and bent glass of the furnace system by providing a control system.

3. The method as claimed in claim 1, further comprising a step of increasing a number of necessary emergency shut downs of the heating elements of the furnace by providing a control system.

4. The method as claimed in claim 3, wherein the step of increasing a number of necessary emergency shut downs of the heating elements of the furnace while avoiding a shutdown of the heating elements due to a noisy output of pyrometers and false alarms involves enhancing an output reading reliability using a Bayesian rule for 2 sensors, wherein according to Bayesian rule for 2 sensors $$P(B \mid A_1, A_2) = \frac{P(B) \cdot P(A_1 \mid B) \cdot P(A_2 \mid B)}{P(B) \cdot P(A_1 \mid B) \cdot P(A_2 \mid B) + P(\overline{B}) \cdot P(A_1 \mid \overline{B}) \cdot P(A_2 \mid \overline{B})}$$

Where B is a fused output reading with a desired reliability and $A_1$ and $A_2$ are output readings of the pyrometers and thermocouples with a desired reliability respectively, wherein B corresponds to a first fused temperature measurement for the right side of the molten glass, when $A_1$ and $A_2$ are thermocouple and pyrometer readings obtained from right side of the molten glass and wherein B corresponds to a second fused temperature measurement for the left side of the molten glass, when $A_1$ and $A_2$ are thermocouple and pyrometer readings obtained from left side of the molten glass.

\* \* \* \* \*